United States Patent
Tam et al.

(10) Patent No.: US 7,409,568 B2
(45) Date of Patent: Aug. 5, 2008

(54) POWER SUPPLY VOLTAGE DROOP COMPENSATED CLOCK MODULATION FOR MICROPROCESSORS

(75) Inventors: Simon M. Tam, Redwood City, CA (US); Rahul Limaye, Santa Clara, CA (US); Utpal Desai, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 11/481,717

(22) Filed: Jul. 5, 2006

(65) Prior Publication Data

US 2006/0253719 A1   Nov. 9, 2006

Related U.S. Application Data

(62) Division of application No. 10/627,272, filed on Jul. 25, 2003, now Pat. No. 7,225,349.

(51) Int. Cl.
   *H03B 19/00* (2006.01)
(52) U.S. Cl. .......... 713/322; 713/300; 713/310; 713/320; 713/321; 713/323; 713/324; 713/330; 713/340; 713/401; 713/600; 713/601; 327/114; 327/361

(58) Field of Classification Search .......... 713/300, 713/310, 320–324, 330, 340, 401, 600–601; 327/114, 361
See application file for complete search history.

(56) References Cited

U.S. PATENT DOCUMENTS

| | | | |
|---|---|---|---|
| 5,324,992 A * | 6/1994 | Maly | 327/172 |
| 5,559,553 A | 9/1996 | Bitek | |
| 6,152,613 A | 11/2000 | Martin et al. | |
| 6,184,753 B1 | 2/2001 | Ishimi et al. | |
| 6,243,784 B1 | 6/2001 | Anderson et al. | |
| 6,445,230 B1 | 9/2002 | Rupp et al. | |
| 6,586,971 B1 | 7/2003 | Naffziger et al. | |
| 6,643,499 B1 | 11/2003 | Audiont et al. | |
| 6,804,793 B2 * | 10/2004 | Josephson et al. | 713/501 |
| 6,828,848 B2 | 12/2004 | Lee | |
| 6,876,239 B2 | 4/2005 | Bell | |
| 6,922,111 B2 | 7/2005 | Kurd et al. | |
| 7,225,349 B2 * | 5/2007 | Tam et al. | 713/322 |
| 2002/0087896 A1 | 7/2002 | Cline et al. | |
| 2003/0112038 A1 | 6/2003 | Naffziger et al. | |
| 2003/0227335 A1 | 12/2003 | Ebihara | |
| 2004/0119521 A1 | 6/2004 | Kurd et al. | |

* cited by examiner

*Primary Examiner*—Abdelmoniem Elamin
(74) *Attorney, Agent, or Firm*—Blakely, Sokoloff, Taylor & Zafman LLP

(57) ABSTRACT

A voltage source droop compensated clock modulation for microprocessors is described. Specifically, the circuit reduces the clock frequency if a voltage source droop is detected.

15 Claims, 5 Drawing Sheets

POWER SUPPLY VOLTAGE DROOP COMPENSATED CLOCK MODULATION FOR MICROPROCESSORS

CROSS-REFERENCES TO RELATED APPLICATIONS

This is a divisional of U.S. patent application Ser. No. 10/627,272 filed Jul. 25, 2003, now U.S. Pat. No. 7,225,349.

FIELD OF THE INVENTION

The present invention pertains to the field of integrated circuit design. More particularly, the present invention relates to a compensated clock generation system that intentionally increases the clock period if a droop is detected in the power supply.

BACKGROUND OF THE INVENTION

Power dissipation in high performance microprocessors continue to increase due to the use of parallel architectures, larger on-die cache memories, and increasing clock frequencies. Parallel architectures may include processor core designs that permit multiple operations running at the same time or multiple cores on the same die. Scaling the power supply voltage (Vcc) in accordance with changing process technology is a typical method to improve performance while staying within a power envelope.

Power supply voltage scaling, however, may have significant design implications. For example, lower Vcc levels reduce the circuit design voltage headroom. Therefore, a Vcc droop that is transient in nature may reduce the circuit operating speed or even result in circuit failures. Voltage droop may be caused by power delivery inductive noise generated by an increase in microprocessor activities.

In order to mitigate the effects of Vcc droop, on-die power supply de-coupling and on-die Vcc filtering techniques are often used. However, on-die de-coupling using conventional MOS gate capacitors is becoming increasingly impractical due to the high MOS gate leakage. Low leakage on-die capacitors are typically area intensive and inefficient. On-die Vcc filtering can typically only be applied to a limited number of devices due to the additional voltage drop and leakage. Moreover, since on-die capacitors are needed for the Vcc filters, this technique suffers the same drawback as on-die Vcc de-coupling due to the on-die capacitor constraints.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

On-die clock distribution elements typically share the same Vcc with other circuit elements. Therefore, a Vcc droop may impact both the clock distribution delay and the data delay, albeit not to the same extent. For example, modulation of the clock distribution delay may result in the stretching or shrinking of the instantaneous clock period. In contrast, the data may experience a slow down followed by some recovery. The temporal behavior between the clock and the data may cause a circuit failure if the data is experiencing a slow down while the instantaneous clock period is shrinking.

For one embodiment of the invention, the compensated core clock modulation scheme may be used to help minimize the effects of a Vcc droop. The clock period during a voltage droop may be extended around the voltage droop to compensate for the data slow down in the circuit. This intentional increase in the clock period is called "relaxation." Relaxation permits a reduction in the integrated circuit's frequency guard band. A smaller frequency guard band may facilitate a higher product yield and bin split without the excessive costs associated with traditional power supply de-coupling solutions.

The duration and the magnitude of the clock compensation are tailored to match the Vcc droop characteristics and the operating environment. The relaxation may last for a predetermined number of clock cycles. The relaxation may provide additional clock period headroom while the data is experiencing a slow down. In other words, relaxation may compensate for the difference between the temporal behavior of the clock and the data. By providing the needed clock period relaxation when needed, the negative circuit margin caused by the Vcc droop is improved. The corresponding frequency guard band is also minimized.

Figure 1:
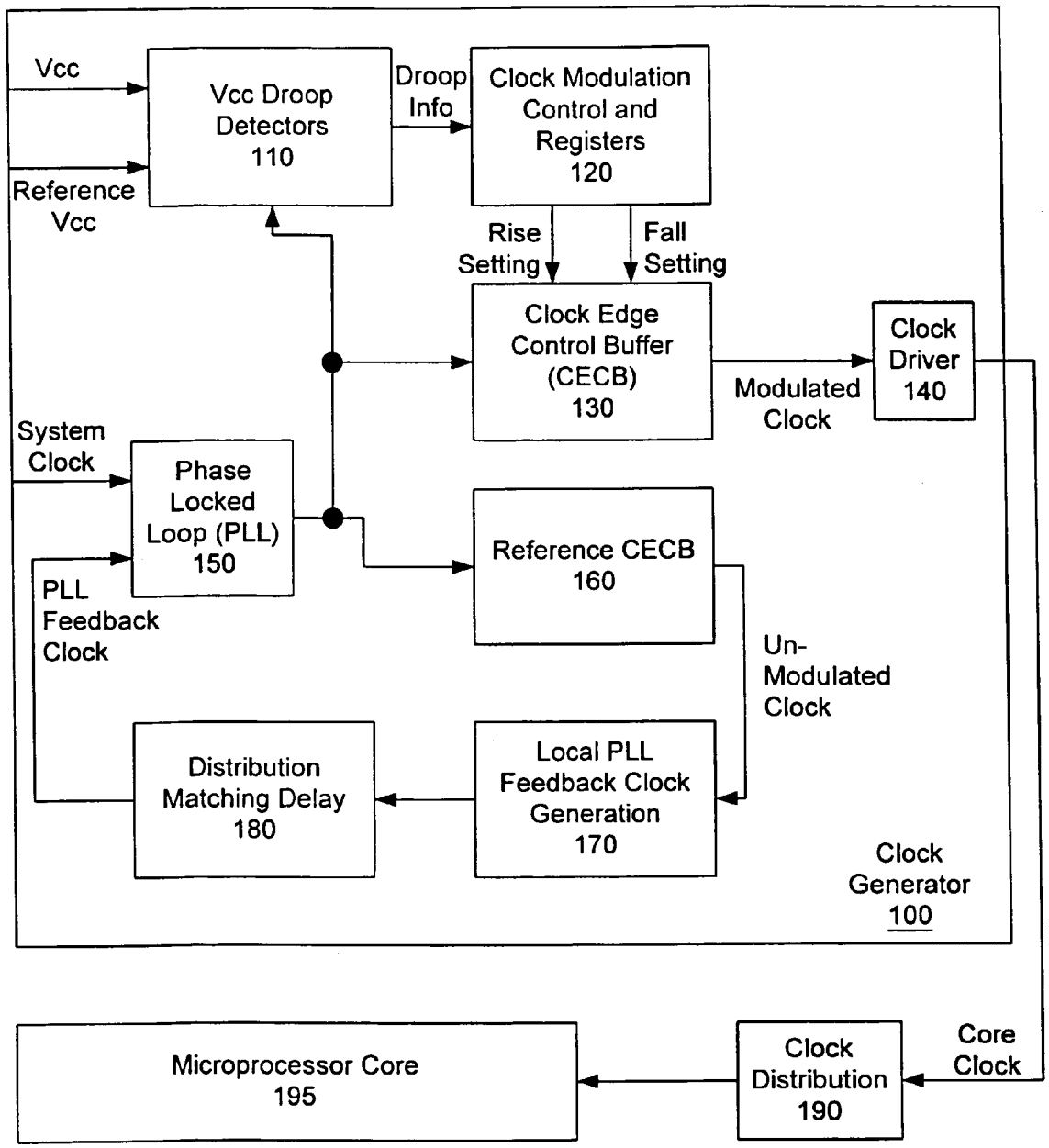
FIG. 1 is an embodiment of a clock generator for providing a Vcc droop compensated clock modulation circuit.

FIG. 1 depicts an embodiment of a clock generator 100 for providing a Vcc droop compensated clock modulation in a computer system. The computer system may be a desktop computer or a server. The clock generator 100 comprises a phase locked loop (PLL) 150 coupled to Vcc droop detectors 110, a clock edge control buffer (CECB) 130, and a reference CECB 160. The Vcc droop detectors 110 are coupled to clock modulation control and registers (CMCR) 120. The reference CECB 160 is coupled to a local PLL feedback clock generation circuit 170. The local PLL feedback clock generation circuit 170 is coupled to a clock distribution matching delay circuit 180. The CECB may be coupled to a clock driver 140 that supplies enough current to drive a clock distribution network 190. The clock distribution network 190 is coupled to a microprocessor core 195.

For one embodiment of the invention, the clock generator 100 and the microprocessor core 195 are fabricated on separate chips. For another embodiment of the invention, the clock generator 100 may be a part of the microprocessor core 195. Thus, the clock generation circuit 100 and the microprocessor core 195 may be fabricated on a single silicon die.

A system clock and a PLL feedback clock are input to PLL 150. The PLL 150 may synchronize a microprocessor core clock with another clock such as a system clock. The output of the PLL 150 may be fed to Vcc droop detectors 110, CECB 130, and reference CECB 160. The Vcc droop detectors 110 also receive a Vcc and a reference Vcc as inputs. The Vcc droop detectors 110 compare the Vcc value with the reference Vcc value. The reference Vcc value is approximately equal to the ideal Vcc value. The Vcc droop detectors 110 communicate droop information to the CMCR 120.

If a droop is detected, a droop trigger signal may be generated and output to the CMCR 120. Vcc droop occurs when the Vcc value is less than the reference Vcc value. The reference Vcc may be a voltage value filtered directly from the package power plane. The voltage value obtained from the package power plane may have less noise than a value obtained from the on-die power grid. The CMCR 120 may comprise a state machine that cycles through a plurality of edge control registers that adjusts the timing of the outgoing clock through a rise setting and a fall setting. The CMCR 120 is further described below in FIG. 2.

The rise and fall settings generated by the CMCR 120 are used to control the CECB 130. The CECB 130 is further described below in FIG. 4. The CECB 130 outputs a modulated clock. The clock driver 140 ensures that the modulated clock has sufficient drive strength for the clock distribution network 190.

The reference CECB 160, the local PLL feedback clock generation 170, and the distribution matching delay 180 form the feedback path to the PLL 150. The PLL synchronizes the system clock with each of the points at the end of the clock distribution network 190. Thus, the delay through the feedback path should closely match the delay from the output of the PLL 150 to the end points of the clock distribution network 190. For this embodiment of the invention, microprocessor core 195 is an end point of the clock distribution network 190.

The reference CECB 160 approximates the default delay of the CECB 130. The local PLL feedback clock generation 170 may be a divider since the clock generated by the PLL clock may be orders of magnitude greater in frequency than the system clock. The distribution matching delay 180 may be approximately equal to the delay of the clock distribution network 190.

Figure 2:
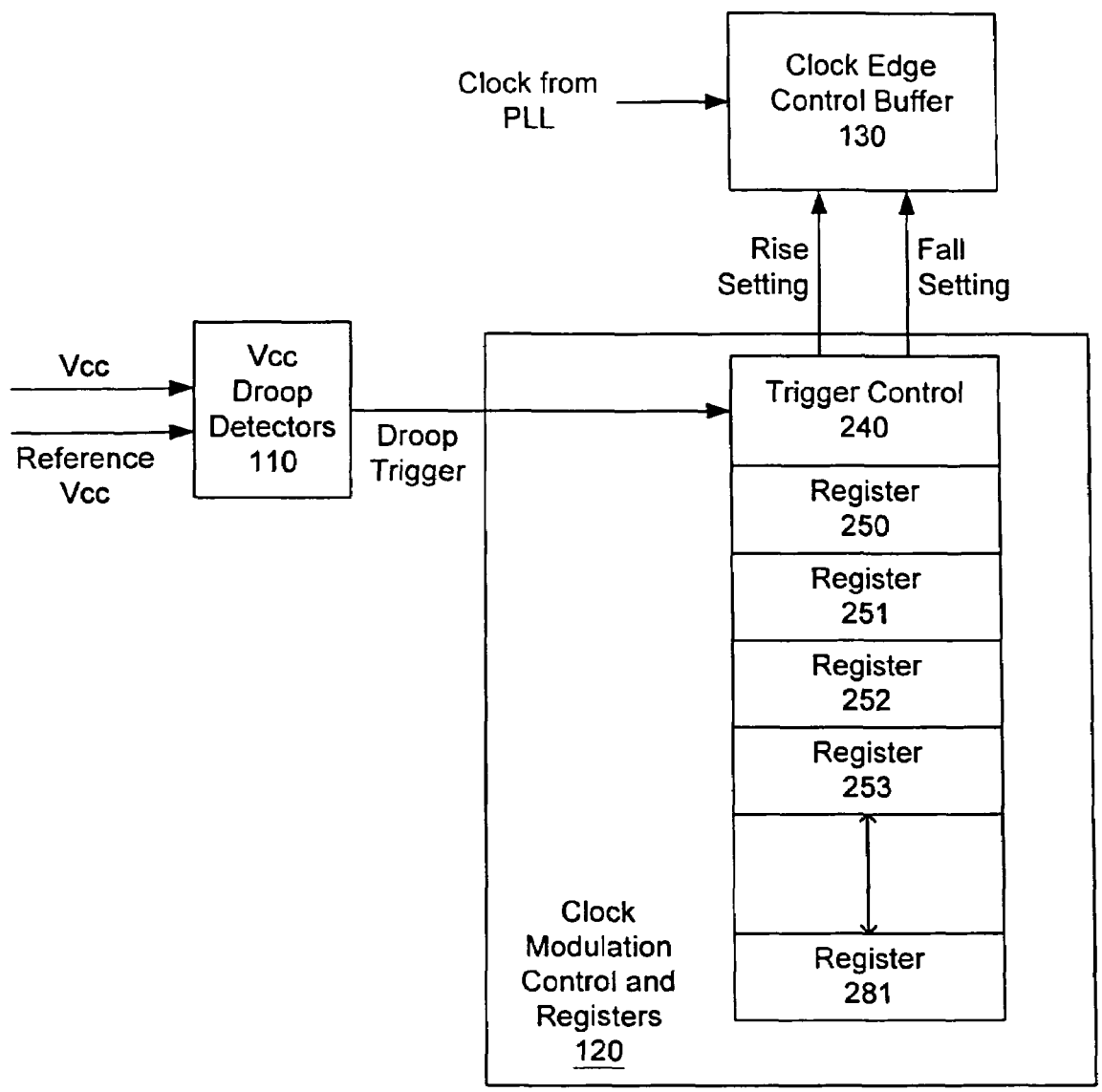
FIG. 2 is an embodiment of the clock modulation control and registers.

An embodiment of the CMCR 120 is depicted in FIG. 2. The CMCR 120 comprises trigger control 240 and a plurality of registers 250-281. For this embodiment of the invention, CMCR 120 has 32 registers. CMCR 120, however, is not limited to 32 registers. The register values are preset via fuses or focused ion beam (FIB) metal options. In addition, the settings may be reprogrammed through a boundary scan device such as a TAP controller, a microprocessor status register (MSR), or processor abstract layer (PAL).

The rise and fall settings stored inside the registers may be coded to have two operating phases. For example, a first operating phase may be stored in a first plurality of registers and a second operating phase may be stored in a second plurality of registers. Phase one stretches the clock period over a number of clock cycles. During phase one, the clock period is increased. Phase two gradually reduces the clock period and recovers the latency added to the clock during phase one. The reduction of a rise and fall settings programmed to any register cannot exceed the frequency guard band. In fact, the total reduction of the clock period with respect to the uncompensated clock during phase two must be less than the frequency guard band.

For another embodiment of the invention, CMCR 120 may have less than 32 registers or greater than 32 registers.

Figure 3:
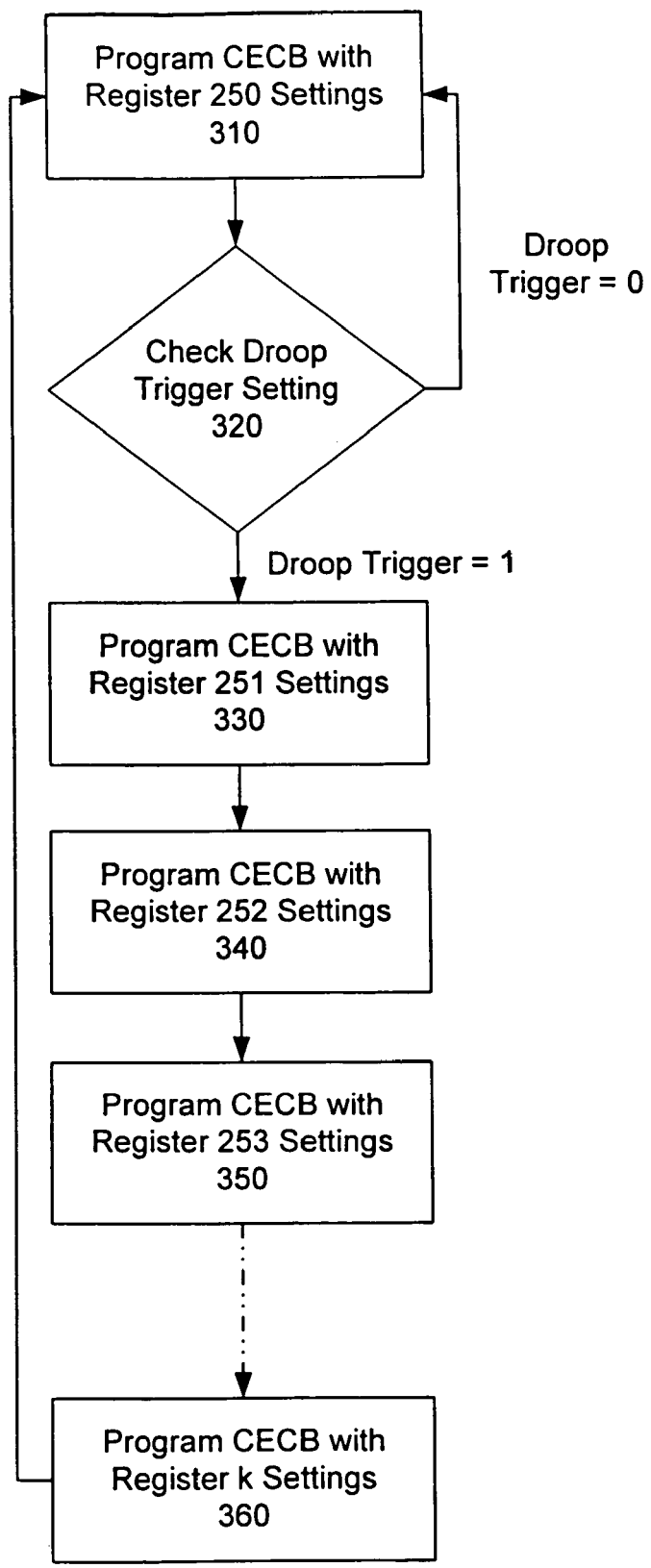
FIG. 3 is a flowchart of the clock modulation control and registers functionality.

The trigger control 240 of the CMCR 120 receives a droop trigger from Vcc droop detectors 110. The trigger may be a binary number that tells the CMCR 120 whether a Vcc droop has occurred and possibly tells the amount of the droop. For another embodiment of the invention, the trigger may be an analog signal. FIG. 3 depicts a flowchart of the CMCR 120 functionality. The trigger of FIG. 3 is represented by a single binary number. The CMCR 120 of FIG. 3 has k registers. For one embodiment of the invention, k may be an integer equal to 32.

The rise setting and the fall settings are input bits to the CECB 130, which adjusts the clock period. The rise and fall control bits permit independent adjustment of the clock rise and fall edge delays. In operation 310, the trigger control 240 programs the CECB 130 with the settings from register 250. The rise and fall settings of register 250 represent the default rise and fall delays. If the droop trigger is "0" in operation 320, then the trigger control 240 continues to get the CECB 130 settings from register 250.

However, if the droop trigger is "1," the trigger control 240 reads the CECB 130 settings from register 251 as shown in operation 330. The CECB 130 settings are then read from register 252 in operation 340 followed by register 253 in operation 350, until all k register settings have been read in operation 360. After operation 360, trigger control 240 again accesses the default rise and fall settings in operation 310.

Figure 4:
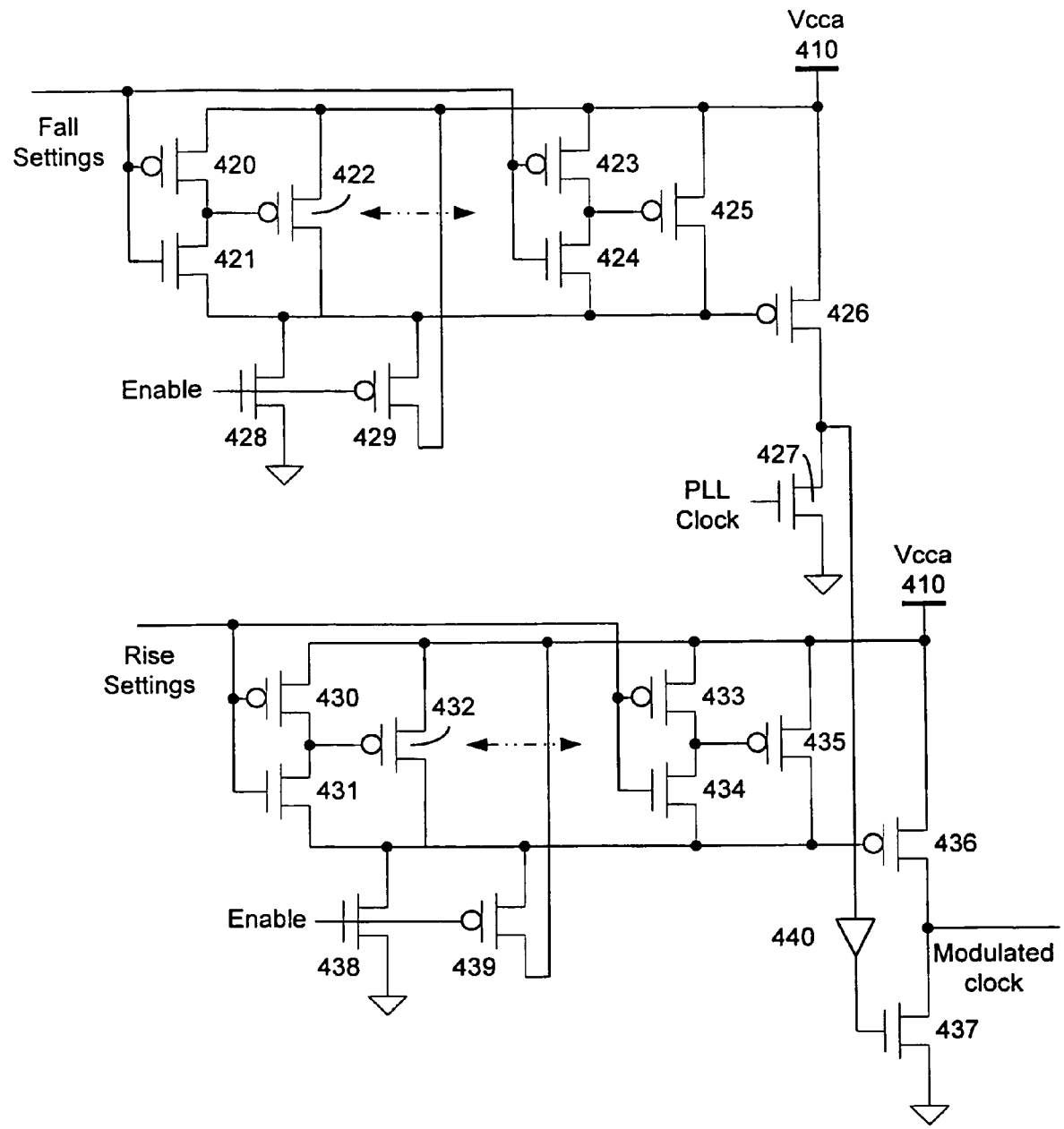
FIG. 4 is an embodiment of a clock edge control buffer.

An embodiment of the CECB 130 is depicted in FIG. 4. Transistors 420 and 421 are coupled to transistor 422, transistor 428 and transistor 429. Transistor 422 is coupled to transistors 423 and 424. Transistors 423 and 424 are coupled to transistor 425. Transistor 425 is coupled to transistor 426. Transistors 430 and 431 are coupled to transistor 432, transistor 438, and transistor 439. Transistor 432 is coupled to transistors 433 and 434. Transistors 433 and 434 are coupled to transistor 435. Transistor 435 is coupled to transistor 436. The transistors of FIG. 4 are powered by an analog voltage source, Vcca 410.

The clock generated by PLL 150 is coupled to transistor 427. The fall settings from CMCR 120 are coupled to a first circuit that comprises transistors 420-425. Transistors 420-425 determine the amount of current that flows from transistor 426 to transistor 427. The output of the first circuit is measured between transistors 426 and 427. The first circuit may be enabled or disabled through transistor 428. When the first circuit is disabled, transistor 429 is asserted, which sets the gate of transistor 426 to Vcc.

The rise setting from CMCR 120 are coupled to a second circuit that comprises transistors 430-435. The output of the first circuit is coupled to the gate of transistor 437. Buffer 440 is coupled between the first circuit and transistor 437 to help provide drive strength. The transistors 430-435 determine the amount of current that flows from transistor 436 to transistor 437. The second circuit may be enabled or disabled through transistor 438. When the second circuit is disabled, transistor 439 is asserted, which sets the gate of transistor 436 to Vcc.

Figure 5:
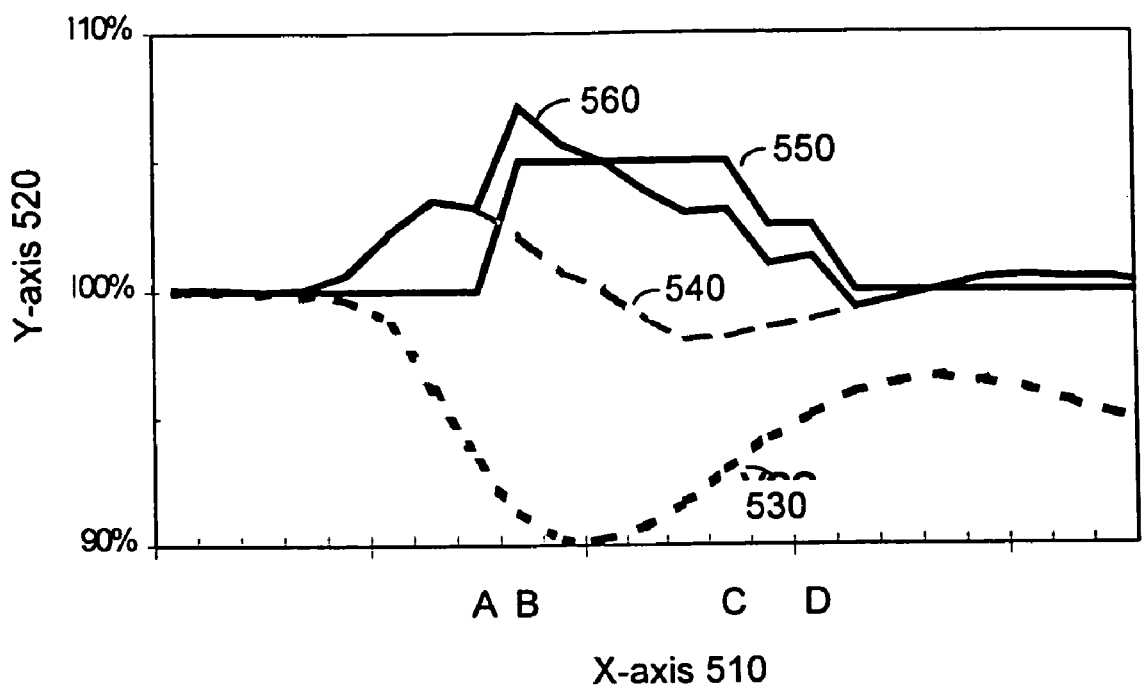
FIG. 5 is a graph comparing a compensated clock with an uncompensated clock after a Vcc droop.

FIG. 5 depicts an example of a graph of a compensated clock when a Vcc droop 530 is detected in comparison to an uncompensated clock. X-axis 510 represents time. Y-axis 520 represents the percentage of default. For Vcc, the percentage of default is the Vcc voltage at a given time divided by the default Vcc voltage. In contrast, the percentage of default for a clock is the actual clock period divided by the default clock period at a given time. Curve 540 is an uncompensated clock at the end of a clock distribution network. Curve 550 is a compensated clock at the source of a clock distribution network. The source of a clock distribution network may be measured from the output of the clock driver 140. Curve 560 is the compensated clock at the end of a clock distribution network.

When Vcc droop detectors 110 detect a Vcc droop 530, the clock modulation and control registers 120 introduce an initial stretch to the clock period. In the instance depicted in FIG. 5, the initial stretch of the curve 550 occurs at time A and lasts until time B. The stretch is maintained from time B to time C. As stated above, phase one is defined by the stretch of a clock over a number of clock cycles. Here, phase one includes the total stretch from time A to time C. Phase one is followed by phase two, which consists of a gradual reduction to the clock period from time C to time D. The difference between the percentage of default between curve 540 and curve 560 shows the delay added to the uncompensated clock at the end of the clock distribution network.

For one embodiment of the invention, time A may be at core clock cycle 8, time B may be at core clock cycle 9, time C may be at core clock cycle 14, and time D may be at core clock cycle 17.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system, comprising:
a processor having a power supply with a voltage;
a first circuit, coupled to the processor, that monitors the power supply voltage; and
a second circuit, coupled to the first circuit, that increases a clock period of a clock coupled to the processor over a predetermined number of clock cycles if the first circuit detects that the power supply voltage is less than a reference voltage, the predetermined number of clock cycles does not reduce an operating frequency of the processor so as to exceed a frequency guard band, wherein the second circuit includes (i) a trigger control in communication with power droop detectors to receive a droop trigger signal to indicate an amount of a voltage droop detected by the power droop detectors and (ii) a plurality of registers with a first register of the plurality of registers including default delay settings for setting an output clock signal.

2. The computer system of claim 1, wherein the second circuit decreases the clock period for a plurality of clock cycles after the increase in the clock period.

3. The computer system of claim 1, further comprising:
a phase locked loop (PLL), coupled to the second circuit, that generates the clock, wherein the clock is distributed to the processor.

4. The computer system of claim 1, wherein the computer system is a desktop computer.

5. The computer system of claim 1, wherein the computer system is a server.

6. A clock modulation circuit, comprising:
means for detecting a power supply voltage droop, the means for detecting a power supply voltage droop include a plurality of power droop detectors; and
means for stretching a clock period after detecting the voltage droop where the stretching of the clock period does not exceed an established frequency guard band, the means for stretching the clock period includes a clock modulation control and registers (CMCR) in communication with the plurality of wet droop detectors, and the CMCR includes (i) a trigger control in communication with the power droop detectors to receive a droop trigger signal to indicate an amount of a voltage droop detected by the power droop detectors and (ii) a plurality of registers with a first register of the plurality of registers including default delay settings for setting an output clock signal.

7. The clock modulation circuit of claim 6, further comprising:
means for programming the clock period stretch.

8. The clock modulation circuit of claim 6, further comprising:
means for recovering the clock period stretch.

9. A method, comprising:
monitoring a voltage applied to a processor;
increasing a period of a clock applied to the processor if a trigger control in communication with power droop detectors receives a droop trigger signal indicating an amount of a voltage droop detected by the power droop detectors to be below a predetermined potential; and
decreasing the period of the clock to compensate for a prior increase in the period of the clock periods where a total decrease of the period of the clock is less than a frequency guard band for the processor.

10. The method of claim 9, wherein the clock period is decreased to the original clock frequency of the processor prior to the voltage droop.

11. The clock modulation circuit of claim 6, wherein the default delay settings of the first register of the CMCR constitutes a default rise time delay and a default fall time delay that may be alternatively used or collectively used to effectively adjust a time period of the output clock signal.

12. The clock modulation circuit of claim 6, wherein the output clock signal is a clock signal supplied to a processor signal.

13. The clock modulation circuit of claim 6, wherein the plurality of registers are permanently preset via fuses.

14. The clock modulation circuit of claim 6, wherein the plurality of registers of the CMCR further comprises a second plurality of registers excluding the first register, the second plurality of registers including additional settings to adjust rise time and fall time settings of an output clock signal.

15. The method of claim 9, wherein decreasing of the period of the clock is a gradual reduction of the period of the clock to recover a latency previously added to the clock.

* * * * *